(12) United States Patent
Brambilla et al.

(10) Patent No.: US 9,695,254 B2
(45) Date of Patent: Jul. 4, 2017

(54) METALLOCENE CATALYST SUPPORTED BY HYBRID SUPPORTING MEANS, PROCESS FOR PRODUCING SAME, POLYMERIZATION PROCESS FOR PRODUCING AN ETHYLENE HOMOPOLYMER OR COPOLYMER WITH BROAD OR BIMODAL MOLAR MASS DISTRIBUTION, USE OF THE SUPPORTED METALLOCENE CATALYST AND ETHYLENE POLYMER WITH BROAD OR BIMODAL MOLAR MASS DISTRIBUTION

(71) Applicants: Braskem S.A., Camacari (BR); Universidade Federal do Rio Grande do Sul, Porto Alegre (BR)

(72) Inventors: Rodrigo Brambilla, Porto Alegre (BR); Marcia Silva Lacerda Miranda, Porto Alegre (BR); Joao Henrique Zimnoch dos Santos, Porto Alegre (BR); Fernando Silveira, Canoas (BR)

(73) Assignee: Braskem S.A., Camacari-BA (BR)

( * ) Notice: Subject to any disclaimer, the term of this patent is extended or adjusted under 35 U.S.C. 154(b) by 0 days.

(21) Appl. No.: 14/646,854

(22) PCT Filed: Nov. 26, 2012

(86) PCT No.: PCT/BR2012/000475
§ 371 (c)(1),
(2) Date: May 22, 2015

(87) PCT Pub. No.: WO2014/078919
PCT Pub. Date: May 30, 2014

(65) Prior Publication Data
US 2015/0274852 A1 Oct. 1, 2015

(51) Int. Cl.
| | |
|---|---|
| *C08F 4/02* | (2006.01) |
| *C08F 4/6592* | (2006.01) |
| *C08F 110/02* | (2006.01) |
| *C08F 210/02* | (2006.01) |
| *C08F 4/76* | (2006.01) |
| *C08F 4/659* | (2006.01) |
| *C08F 210/16* | (2006.01) |

(52) U.S. Cl.
CPC .......... *C08F 4/76* (2013.01); *C08F 4/02* (2013.01); *C08F 4/65916* (2013.01); *C08F 210/16* (2013.01); *C08F 4/65912* (2013.01); *C08F 4/65925* (2013.01); *C08F 110/02* (2013.01); *C08F 2410/01* (2013.01)

(58) Field of Classification Search
CPC ...... C08F 4/02; C08F 4/65916; C08F 110/02; C08F 210/02
See application file for complete search history.

(56) References Cited

U.S. PATENT DOCUMENTS

| | | | |
|---|---|---|---|
| 4,914,253 A * | 4/1990 | Chang | C08F 10/02 526/129 |
| 5,194,200 A * | 3/1993 | Anderson | B01D 67/0048 210/510.1 |
| 2006/0183631 A1 | 8/2006 | Lee et al. | |
| 2012/0172548 A1 | 7/2012 | Cho et al. | |

OTHER PUBLICATIONS

Adriano G. Fisch et al.: "Supported Metallocene Catalysts for Polyolefin Production: Review of the Immobilization Strategies", Quimica Nova vol. 34 No. 4 646-657, 2011.
Maria De Fatima V. Marques et al.: "Catalisadores Metalocênicos: Aspectos Gerais e Heterogeneização", Polímeros: Ciência e Tecnologia—Jul./Set—98.
Fernando Silveira: "A Estrutura de Metalocenos Hibridos, Homogêneos e Suportados, e Seu Efeito na Performance em Polimerização de Etileno", Universidade Federal do Rio Grande do Sul. Instituto de Química. Programa de Pós-Graduação em Química, Porto Alegre, dezembro de 2008.
Rossana Borges Cavalcante Vilar: "Desenvolvimento de Silicas Organofuncionalizadas para Pré-concentração de Cátions Metálicos em meio Aquoso e Etanólico", Universidade Federal do Rio Grande do Sul. Instituto de Química. Programa de Pós-Graduação em Química, Porto Alegre, julho de 2007.
International Search Report, PCT/BR2012/000475.

* cited by examiner

*Primary Examiner* — Caixia Lu
(74) *Attorney, Agent, or Firm* — Duane Morris LLP

(57) ABSTRACT

The present invention describes a metallocene catalyst based on a transition metal of group 4 or 5 of the periodic table; supported on a hybrid catalytic support with aliphatic organic groups and a process for supporting metallocene on the hybrid catalytic support. The supported metallocene catalyst provides an ethylene polymer with broad or bimodal molecular weight distribution in the presence of only one metallocene complex on the support.

6 Claims, 3 Drawing Sheets

METALLOCENE CATALYST SUPPORTED BY HYBRID SUPPORTING MEANS, PROCESS FOR PRODUCING SAME, POLYMERIZATION PROCESS FOR PRODUCING AN ETHYLENE HOMOPOLYMER OR COPOLYMER WITH BROAD OR BIMODAL MOLAR MASS DISTRIBUTION, USE OF THE SUPPORTED METALLOCENE CATALYST AND ETHYLENE POLYMER WITH BROAD OR BIMODAL MOLAR MASS DISTRIBUTION

BACKGROUND OF THE INVENTION

The present invention relates to a metallocene catalyst based on a transition metal from group 4 or 5 of the periodic table which is supported by hybrid catalyst supporting means with aliphatic organic groups.

One also describes the process for supporting metallocene on said hybrid catalytic supporting means with aliphatic organic groups.

The main advantage of the supported metallocene catalyst of the present invention is that an ethylene polymer with broad or bimodal molar mass distribution is produced by using only one type of metallocene complex on the supporting means. As a result, the resin produced can be processed in an improved manner, and one obtains a potential reduction of processing costs.

There are many researches involving the development of metallocene catalysts. These catalysts, due to the fact that they have a single active center, enable the production of polyolefins with properties that are differentiated in terms of molecular mass, molar mass distribution, stereoregularity and incorporation and co-monomer distribution.

Particularly, polymers that have a narrow distribution of molar mass exhibit better physical properties, such as resistance to impact and to "environmental stress cracking", as well as film transparency. However, these polymers exhibit processing difficulty due to their restriction in the distribution of molar mass.

In general, a broad distribution of molar mass provides greater fluidity of the polymer in the molten state, facilitating the processing thereof.

Thus, a few strategies for broadening the distribution of molar mass of polyolefins produced by using metallocene catalysts have been developed in the prior art. Among them we can cite: (i) blends of polymers produced by two different catalysts such as described in U.S. Pat. No. 6,649,698 and U.S. Pat. No. 6,787,608; (ii) use of multi-reactor technology as described in WO07336A1; U.S. Pat. No. 6,566,450; U.S. Pat. No. 7,488,790, and WO/2005/005493; (iii) combination of two metallocenes that are not supported on the polymerization of olefins, as mentioned in US. Pat. No. 0,234,547A1 and US2011257348A1; and (iv) polymerization of olefins by using a catalyst prepared by immobilizing two different metallocenes or one metallocene and one non-metallocene in the same support, as for instance in U.S. Pat. No. 719,302B2; U.S. Pat. No. 7,312,283B2; U.S. Pat. No. 6,943, 134B2; U.S. Pat. No. 0,183,631A1; U.S. Pat. No. 5,525, 678A; U.S. Pat. No. 7,199,072B2; U.S. Pat. No. 199,072b2; U.S. Pat. No. 6,686,306B2, and U.S. Pat. No. 6,001,766A.

The use of catalytic systems for polymerizing olefins comprising supported metallocene catalysts comprising inorganic supports is extensively described in the literature (Hlatky, Chem. Rev. 100 (2000) 1347-1376; Severn et alli, Chem Rev. 105 (2005) 4073-4147).

As can be seen from the prior art, silica has been the inorganic support at that is most widely employed in the development of supported metallocene catalysts. The surface and reactivity of the functional silica groups (isolated silanols, vicinal and geminal silanols, and siloxane) are well known. Obtaining them involves well-known pathways, among which is precipitation (precipitated silicas), and resulting from hydrolysis and reactions and condensation (xerogel silicas, aerogels, hydrogels). See, example, US 1970/3505785; US1971/3855172; DE1972/2224061; US1974/3668088; DE1975/2505191; US1975/3922393; DE1977/2719244; DE1976/2628975; US1979/4179431; EP1980/0018866; DE1986/3518738; DE1989/0341383; EP1989/0335195A2; US 1992/5118727 and US 1998/5723181.

Various pathways for preparing supported metallocene catalysts have been described in the literature and may be classified into:

(i) direct immobilization on silica as described in Santos et alli, Macromol. Chem. Phys. 198 (1997) 3529; Dos Santos et alli, J. Mol. Catal A; 139 (1999) 199; Dos Santos et alli, Macromol. Chem. Phys. 200 (1999) 751);

(ii) immobilization on silica functionalized with methylaluminoxane (herein referred to as MAO), or with other types of catalysts, as described in US1989/4808561; US1989/4871705; US1990/4912075; US1990/4914253; US1990/4925821; US1990/4935397; US1990/4925217; US1990/4921825; US1991/5026797; US1991/5006500; US1992/5086025; US1993/5328892; WO1994/26793; US1995/5462999; WO1996/04318; US 1995/5468702; EU1997/849286; WO1997/42228; US1997/5629253; US1997/5661098; EU1998/922717; EU1998/856525; US1998/5712353; US1998/5739368; US1998/5763543; US1998/5719241; EU1999/989139; US1999/5968864; EU2000/1038855; US2000/6034024; WO2001/12684; WO2001/40323; US2001/6214953; EU2001/1167393; US2001/0051587; US2001/0053833; EU2002/1231225; US2002/40549; US2002/0107137; US2003/236365 and WO2004/055070;

(iii) synthesis of metallocene situ on the support, as described in JP1990/0485306; US1996/5504408; US998/5739226; US2002/6399531; and US2002/326005;

(iv) Immobilization on hybrid silica, as described in: Dos Santos et alli, Appl. Catal. A: Chemical 220 (2001) 287-392; Dos Santos et alli, Polymer 42 (2001) 4517-4525; Dos Santos et alli, J. Mol. Catal. A: Chemical 158 (2002) 541-557; and (v) Immobilization on silicas modified with spacers, as describes, for example, in US1995/5397757; US1995/257788 and US1997/5639835.

The pathway (i) consists of the reaction between the silica silanol groups and the group that gives off the metallocene (chloride or hydride) in the presence of an organic solvent. The pathway (ii) essentially comprises pre-contact of the support with MAO or other alkylaluminums, followed by immobilization of the metallocene. In the pathway (iii), the silanol groups of the silica surface are reacted with compounds of the type MCl4 (M=Ti, Zr) and then with indenyl or cyclopentadienyl ions, or the silanol groups of the silica surface are reacted organosilanes provided with ligands of the cyclopentadiene or indene type, which by deprotonation generate aromatic ions that may be metallized with reactants of the type MCl4 (M=Ti, Zr). Hybrid-silica immobilizing pathways (pathway iv) consist in obtaining a silica containing organic groups on the surface, obtained by the sol-gel method, followed by metallization. This pathway differs from the preceding one in that in pathway (iii) the silica employed is commercial, previously synthesized, whereas in the latter pathway the silica is synthesized already with the organic ligands (hybrid silicas). The pathway (iv) differs from the present invention in that the hybrid silica does not contain aliphatic organic groups and, therefore, does not generate a catalyst capable of producing polyethylenes that are bimodal or have broad distribution of molar mass. Finally, in the last pathway, the catalytic sites are generated or pushed off the surface (vertical spacers) or from each other (horizontal spacers). In both cases, the objective is to increase the catalytic activity of these supported metallocene catalysts.

In the open literature, examples of these five pathways are commented in the bibliographic revisions of Hlatky (*Chem. Rev.* 100 (2000) 1347-1376) and of Severn et al (*Chem Rev.* 105 (2005) 4073-4147). Examples of these methodologies can also be found in documents WO 2006/131704; WO 2006/131703; JP 2006/233208; US 2006/135351; US 2006/089470; JP 2006/233208; US 2001/6239060 and EP 2000/1038885.

Most patent documents that use chemically modified silica employs some type of commercial silica and modify it by grafting reactions or impregnation.

WO 2006/131704 describes the preparation of a supported catalyst, on which, after pre-contacting the co-catalyst with the catalyst (transition metal compounds, particularly metallocenes), in mole ration lower than 10:1, the mixture is contacted with a porous support, followed by removal of the solvent (impregnation method). The preparation method is simple, without implying loss of activity. The same thing happens in US 2006/089470, in which a homogeneous metallocene catalyst and a combination of alkylaluminoxane and alkylaluminum are supported on silica, with average size of 540 µm. Metallocene catalyst and co-catalyst (aluminoxane or alkylaluminum) are also pre-contacted before being immobilized on spheroidal silica (5-40 µm) according to patent EP 200/1038885. In this case, 50% of the catalytic component is immobilized inside the support pores, which guarantees the production of a product having few gel imperfections.

In WO 2006/131703, the porous support is pre-treated with a dehydrating agent and with a hydroxylated compound. The resulting support is then reacted with the catalyst (transition metal compound, such as metallocene, for example) and co-catalyst. The resulting supported catalyst is provided with enhanced catalytic activity. In document JP 2006/233208, the support is also pre-treated, but in this case with aluminoxane compounds, such as MAO, followed by reaction with metallocene. In this case, a part of the support is reacted with an ansa-metallocene and a part with an ansa-fluorenylmetallocen. In both cases, the metallocenes are individually treated with tri-isobutylaluminum (herein referred to as TIBA) and with 1-hexane. The final catalytic system is constituted by the combination of the two supported metallocenes and is active for co-polymerization of ethylene and 1-hexene. In US 2001/6239060, silica, after acidic treatment (HCl) and thermal treatment (110 and 800° C.), is functionalized previously with alkylaluminum and then contacted with metallocene-aluminoxane mixture. In WO 2002/038637, the process of preparing the supported metallocene catalyst is carried out by successive reaction of silica with ordinary alkylaluminum, and with borate derivatives, followed by addition of an ansa-metallocene. The final catalyst, active in the co-polymerization of ethylene and/or propylene with alpha-olefins, guarantees high contents of incorporated co-monomer.

Organoaluminums of the type $Et_2AlH$ and $Et_2Al(OEt)$ were proposed as silica modifying agents in document WO 2003/053578. The resulting silica served as a support for immobilizing metallocene. The resulting system exhibited an increase in catalytic activity, attributed to the additional presence of co-catalysts on the silica surface.

JP 2003/170058 describes the preparation of a support in which commercial silica pre-modified with ordinary alkyl-aluminum and with compounds having electroactive groups, such as 3,4,5-trifluorofenol. The modified silica is employed in the co-polymerization of olefins as a component of the catalytic system constituted by a metallocene and common alkylaluminum. This is no preparation of the final supported catalyst, but rather in situ immobilization, in which the ultimate heterogenization process takes place in situ, inside the polymerization reactor.

JP 2006/274161 teaches the preparation of active supported catalysts for co-polymerization of olefins, capable of polymerizing ethylene and 1-butene in the presence of common alkylaluminums and producing co-polymers with short branching and molar mass distribution (herein referred to as DPM) of 6.8. Such catalysts use silica functionalized with organometallic compounds with metal of the groups 1 and 2, as for example Et2Zn, which is then treated in a number of steps with electron-donating organic solvents, water, before the immobilization of an ansa-metallocene.

US 2006/135351 describes the preparation of the supported catalyst, wherein the metallocene has a functional group that facilitates and leads to a strong bond with the silica surface, used as support, minimizing bleaching processes. According to the technical description of this document, the polymerization takes place without "fouling" in the reactor, in both slurry process and in gaseous phase, and the morphology and density of the polymer produced are much better defined.

Lewis bases such as pentafluorofenol were also used in the modification of silica. The immobilization of metallocenes and organometallic compounds such as chromocene, on the same support (silica) modified with Lewis bases and alkylaluminum generate active catalysts in the co-polymerization of ethylene and 1-hexene, with DPM of 10.9.

WO 2004/018523 describes a process of preparing supported metallocene catalyst, in which the support (silica) is synthesized by a non-hydrolytic sol-gel process by condensing a silane containing anionic ligands, of a halogenated silane (r siloxane) and an alkoxysilane. The hybrid silica generated is then subjected to a metallization reaction, and the resulting catalyst is active, in the presence of a co-catalyst, in processes of polymerization olefins, in gaseous phase.

As can be seen from the prior art, it is not described or expected that the immobilization of a single metallocene complex on a silica-base support results in a polyethylene with broad or bimodal mass distribution. Moreover, the use of hybrid silica provided with aliphatic organic groups, prepared by the sol-gel process, as a support for metallocene was not reported in the literature.

Thus, the present invention relates to metallocene catalysts based on transition metal of the groups 4 and 5 of the periodic table, supported on a hybrid support for the production of homopolymers or copolymers of ethylene with alpha-olefins with broad or bipolar molar mass distribution.

One also describes a process of preparing metallocene catalysts supported on a hybrid catalytic support and a process for the production of homopolymers or copolymers of ethylene with alpha-olefins with broad or bimodal molar mass distribution.

The supported metallocene catalyst of the present invention exhibits, as its main advantage, the fact that it produces an ethylene polymer with broad or bimodal molar mass distribution using only one type of metallocene complex on the support. As a result, one obtains better processability of the resin obtained and, therefore, a potential reduction of the processing cost.

OBJECTIVES OF THE INVENTION

The present invention provides a metallocene catalyst based on transition metal of the groups 4 and 5 of the periodic table, supported on a hybrid catalytic support having aliphatic organic groups.

One also describes a process for supporting metallocene on said hybrid support having aliphatic organic groups.

The present invention also relates to a hybrid catalytic support containing aliphatic organic groups and to the process of preparing it, by means of a hydrolytic sol-gel pathway.

Finally, the present invention relates to a process of producing homopolymers of ethylene and copolymers of ethylene with alpha-olefins with broad or bimodal molar mass distribution.

The supported metallocene catalyst of the present invention exhibits, as its main advantage, the fact that one produces a polymer of ethylene with broad or bimodal molar mass distribution by using only one type of metallocene complex on the support. As a result, one obtains better processability of the resin obtained and, therefore, a potential reduction of processing cost.

BRIEF DESCRIPTION OF THE INVENTION

The present invention relates to a metallocene catalyst based on transition metal of the group 4 or 5 of the periodic table, supported on the hybrid catalytic support having aliphatic organic groups.

A process of supporting metallocene on the hybrid catalytic support and a process of homopolymerizing ethylene or copolymerizing ethylene with alpha-olefins with broad or bimodal molar mass distribution are also described.

The metallocene catalyst supported on a hybrid catalytic support of the invention comprises:

(I) at least one metallocene derived from a compound of formula 1: $[L]_2\text{-}MQ_2$ Formula (1),
wherein:

M is a transition metal of the group 4 or 5 of the periodic table;

Q, which may be equal or different, comprise: halogen radical, aryl radical, alkyl radical containing 1 to 5 carbon atoms or alkoxy radical containing to 5 carbon atoms; and L is a ligand selected from: cyclopentadienyl, indenyl or fluorenyl, either substituted with hydrogen or not, alkyl, cycloalkyl, aryl, alkenyl, alkylaryl, arylalkyl or arylalkenyl, attached to the transition metal by bonding;

(II) a hybrid catalytic support having at least one inorganic component and aliphatic organic groups.

Preferably, the supported metallocene catalyst comprises at least one organometallic reactant containing a metal selected from the groups 2 or 13 of the periodic table.

The process of obtaining supported metallocene catalysts based on transition metal of groups 4 or 5 of the periodic table of the present invention comprises:

a) preparing the hybrid support having aliphatic organic groups;

b) reacting the hybrid support obtained in step (a) with an organometallic reactant;

c) reacting the product obtained in step (b) with the metallocene.

In a preferred embodiment, the hybrid catalytic support is prepared according to the following steps:

i) preparing an aqueous solution of a base diluted in alcohol;

ii) adding a tetraalkylorthosilicate solution to the solution obtained in (i);

iii) reacting a trialkoxydoorganosilicate solution with the solution obtained in (ii);

iv) removing the solvent from the product of the reaction obtained in (iii).

Preferably, the hybrid catalytic support is impregnated with a solution of organometallic compound from the groups 2 or 13 of the periodic table, in an inert organic solvent.

In a preferred embodiment, the hybrid support obtained after impregnation reacts with a metallocene solution based on transition metal of the groups 4 or 5 of the periodic table in an inert organic solvent. After said reaction, the supported catalyst is washed and the solvent is removed.

DETAILED DESCRIPTION OF THE INVENTION

Figure 1:
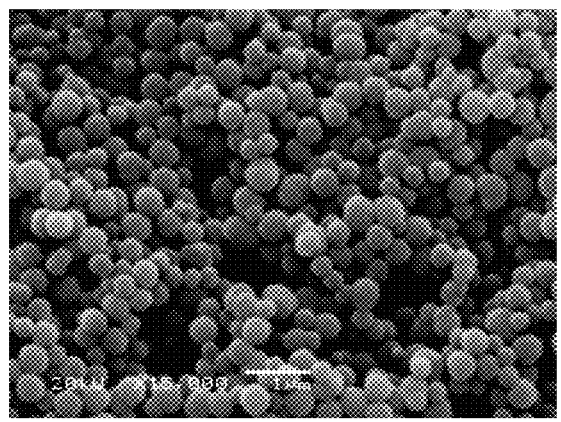
FIG. 1—image of scanning electron microscopy of the hybrid support obtained in Example 1.

For a better understanding of the terms to be mentioned in the present specification, one should consider the following abbreviations and clarifications:

hybrid support: a material constituted by an inorganic component and by at least one organic component;

TEOS: tetraethoxylane;

C contents: total percentage by mass of carbon in the hybrid catalytic support, determined by CHN on a CHN catalyst model 2400, manufactured by Perkin Elmer;

Zr contents: total percentage by mass of zirconium in the supported metallocene catalyst, determined by Rutherford backscattering spectrometry on a 500 kV HVEE ion implanter;

Al contents: total percentage by mass of aluminum in the supported metallocene catalyst, determined by SEM-EDX under a scanning electron microscope with energy-dispersive X-ray spectroscopy y spectrometer model JSM, manufactured by JEOL;

TEAL: triethylaluminum;

$L_2MX_2$: metallocene complex;

Al/SiO2: ratio in weight percentage of transition metal belonging to the group 4 or 5 of the periodic table on silica, determined by Rutherford backscattering spectrometry on a 500 kV HVEE ion implanter. Al/M: mole ratio between aluminum of the co-catalyst and transition metal of the supported complex belonging to the group 4 or 5 of the periodic table;

Catalytic activity: it represents the yield in kilograms (kg) of polymer produced per mole of transition metal belonging to the group 4 or 5 of the periodic table, present in the catalyst, and per hour of reaction;

$T_m$: it represents the measurement of the melting temperature in ° C. of the polymer, determined by Differential Scanning Calorimetry effected on a DSC 2920 analyzer manufactured by TA instruments;

GPC: gel-permeation chromatography;

$M_w$: it represents average weight molecular mass of the polymers, determined by GPC effected on a GPCV 2000 equipment manufactured by Waters;

$M_w/M_n$: it represents the molar mass distribution determined from the GPC curve effected on a GPCV 2000 Waters equipment.

The hybrid catalytic support of the present invention is constituted by an inorganic component, preferably silica, and an organic component. Said organic component is constituted by aliphatic hydrocarbons (or aliphatic organic groups) with chain containing 1 to 40 carbon atoms bonded covalently to the inorganic component. Preferably, the aliphatic hydrocarbons used in the present invention contain from 8 to 22 carbon atoms.

The hybrid catalytic support of the present invention exhibits aliphatic organic groups dispersed homogeneously at molecular level, both on the surface of the organic component and inside it.

The hybrid catalytic support of the present invention is preferably obtained by means of a sol-gel pathway. The sol-gel pathway described in the present invention refers to a hydrolytic pathway in a base medium, wherein the base acts as a catalyst of the sol-gel reaction. This base accelerates the hydrolysis reaction and condensation reaction of the reactants present in said reaction.

The hybrid catalytic support of the present invention preferably has spherical and lamellar morphology and is provided with aliphatic organic groups.

In a preferred embodiment, the process of preparing the hybrid catalytic support comprises the following steps:
i) diluting an aqueous solution of a base in an alcohol;
ii) adding an alcoholic solution of tetraalkylorthosilicate onto the solution obtained in steps (i);
iii) reacting a solution of trialkoxydoorganosilane with the solution obtained in step (ii); and
iv) removing the solvent that is present in the reaction product obtained in step (iii).

According to step (i) of the process of preparing the catalytic support of the present invention, the aqueous solution of a base with concentrations ranging from 0.1 to 5 mole/L is diluted in an alcohol.

The dilution factor (aqueous solution of a base/alcohol) ranges from 10 to 300. Preferably, one uses the dilution factor of 100.

The bases that may be used in step (i) of preparing the hybrid catalytic support are selected from hydroxides of the group I and II, aliphatic and aromatic amines, ammonium hydroxide and/or mixture thereof. Preferably, ammonium hydroxide is used. The pH of the base solution ranges from 8 to 14.

The alcohols that may be used in step (i) of preparing the hybrid catalytic support are selected from: methanol, ethanol, 1-propanol, 2-propanol, 1-butanol, 2-butanol, 1-pentanol, 2-pentanol, 1-hexanol, 2-hexanol and/or mixtures thereof. Preferably, ethanol is used.

The aqueous base solution and the alcohol are subjected to stirring, the stirring velocity ranging from 50 rpm to 40,000 rpm.

In step (ii) of the process of preparing the hybrid catalytic support, an alcoholic solution of tetraalkylorthosilicate is added on the solution obtained in (i).

The alcohols used in step (ii) comprise: methanol, ethanol, 1-propanol, 2-propanol, 1-butanol, 2-butanol, 1-pentanol, 2-pentanol, 1-hexanol, 2-hexanol and/or mixtures thereof.

Non limiting examples of the tetraalkylorthosilicates that are used in the present invention include: tetramethylorthosilicate (TMOS), tetraethylorthosilicate (TEOS), tetrapropylorthosilicate (TPOS), tetrabutylorthosilicate (TBOS) and/or mixtures thereof. Preferably, TEOS is used.

The stirring velocity of the mixture obtained in step (ii) is kept between 50 and 40,000 rpm.

The reaction time of this mixture ranges from 0.1 to 24 hours. Preferably, 2 hours are used. This mixing and stirring step may also be carried out simultaneously in step (iii).

Step (iii) of the process of preparing the hybrid catalytic support comprises reacting a trialkoxyorganosiliane with the solution obtained in step (ii).

The trialkoxyorganosilane has carbon chain ranging from 1 to 40 carbon atoms. Preferably, a trialkoxyorganosilane with 8 to 22 carbon atoms is used.

The alkoxide grouping of said reactant should have from 1 to 4 carbon atoms. Preferably, the alkoxide grouping with 1 carbon atom is used.

Non-limiting examples of trialkoxyorganosilanes that are used in the present invention include: hexadecyltrimethoxysiliane (HDS), heptadecyltrimethoxysiliane (HPDS), octadecyltrimethoxysiliane (ODS), hexadecyltriethoxysiliane (HDES), heptadecyltriethoxysilane (HPDES), octadecyltriethoxysilane (ODES) and/or mixture thereof. Preferably, ODS is used.

The mole ratio of trialkoxyorganosilane:tetraalkylorthosilicate ranges from 1:0 to 1:100, preferably from 1:1 to 1:60.

The addition of trialkoxyorganosilane to the solution obtained in (ii) may be made concomitantly or until 24 hours after addition of tetraalkylorthosilicate. Preferably, the addition of trialkoxyorganosilane is carried out 2 hours after addition of tetraalkylorthosilicate. The reaction is kept for an additional time ranging from 0.1 to 48 h, preferably 2 hours.

The stirring velocity during the reaction should be kept between 50 and 40,000 rpm. Preferably, one uses a stirring velocity of 150 rpm. This step may be carried out simultaneously with step (ii).

In step (iv) of the process of preparing the hybrid catalytic support, one carries out the removal of the solvent that is present in the reaction product obtained in (iii).

The removal of the solvent may be carried out by evaporation at room temperature, filtration, centrifugation, or under reduced pressure. Preferably, one uses reduced pressure in a time ranging from 1 to 24 hours.

The contents of aliphatic organic groups, measured through the C content, of the hybrid catalytic support, obtained in the above-described process, range from 0.5 to 80%. The number of aliphatic organic groups in the catalytic hybrid supports influences the Mw/Mn of the ethylene polymers.

The metallocene catalyst supported in a hybrid catalytic support having aliphatic organic groups of the invention comprises:
at least one metallocene derived from a compound of formula 1: [$L_2$-$MQ_2$ formula (1),
wherein:
M is a transition metal of the group 4 or 5 of the periodic table;
Q, which may be equal or different, comprise: halogen radical, aryl radical, alkyl radical containing 1 to 5 carbon atoms or alkoxy radical containing to 5 carbon atoms; and
L is a ligand selected from: cyclopentadienyl, indenyl or fluorenyl, either substituted with hydrogen or not, alkyl, cycloalkyl, aryl, alkenyl, alkylaryl, arylalkyl or arylalkenyl, attached to the transition metal by bonding;
a hybrid catalytic support having at least one inorganic component and aliphatic organic groups.

Preferably, the supported metallocene catalyst comprises at least one organometallic reactant containing a metal selected from the groups 2 or 13 of the periodic table. More preferably, in the process of preparing the metallocene catalysts, one carries out impregnation of the hybrid support obtained in the preceding step (iv), with a solution of organometallic compound of group 2 or 13 of the periodic table, in an inert organic solvent.

The organometallic compounds that may be used in the step of impregnating the hybrid support are selected from: trimethylaluminum (TMAL)\, triethylaluminum (TEAL), tri-isobutylaluminum (TIBAL), tri-n-hexylaluminum (TNHAL), tri-n-octylaluminum (TNOAL), dimethylaluminum chloride (DMAC), methylaluminum dichloride (MADC), dimethylaluminum dichloride, ethylaluminum dichloride (EADC), di-isobutylaluminum chloride (DI-BAC), isobutylaluminum dichloride (MONIBAC), butyl ethylmagnesium (BEM), butyl octylmagnesium (BOMAG), methyl magnesium chloride, ethylmagnesium chloride and/or mixtures thereof. These compounds may be used in the concentrated or dissolved form. In a preferred embodiment, one uses dissolved compounds in an organic solvent of the aliphatic hydrocarbon type.

When using more than one organometallic compound of the group 2 or 13 of the periodic table in the step of impregnating the hybrid support, the different compounds may be fed to the same solution or to individual solutions, either at the same time or in subsequent additions.

Non-limiting examples of inert organic solvents that may be used for solubilizing the organometallic compound of the group 2 or 13 of the periodic table are selected from: toluene, cyclohexane, n-hexane, n-heptane and n-octane and/or mixtures thereof.

In the step of impregnating the hybrid catalytic support one employs an amount of solvent sufficient to suspend the material.

The amount of organometallic compound of the group 2 or 13 of the periodic table that may be used ranges from 1 to 60% by mass of metal with respect to the mass of hybrid catalytic support. Preferably, one should use an amount ranging from 5 and 30% of metal.

The reaction time of the step of impregnating the hybrid support should range from 0.1 h to 24 h, preferably from 0.5 h to 3 h, and the reaction temperature ranges from −10 C to 80° C., preferably from 0 to 30° C.

After impregnation, the hybrid catalytic support obtained reacts with a metallocene solution based on transition metal of groups 4 or 5 of the periodic table in an inert organic solvent.

The metallocene is derived from a compound of formula 1:

formula (1), $$[L_2\text{-}MQ_2] \quad (I)$$

wherein:
M is a transition metal of the group 4 or 5 of the periodic table;
Q, which may be equal or different, comprise: halogen radical, aryl radical, alkyl radical containing 1 to 5 carbon atoms or alkoxy radical containing to 5 carbon atoms; and
L is a ligand selected from: cyclopentadienyl, indenyl or fluorenyl, either substituted with hydrogen or not, alkyl, cycloalkyl, aryl, alkenyl, alkylaryl, arylalkyl or arylalkenyl, attached to the transition metal by bonding.

Representative but non-limiting examples of compounds having the formula 1 include: $Cp_2TiCl_2$, $Cp_2ZrCl_2$, $Cp_2HfCl_2$, $Cp_2VCl_2$, $Cp_2Ti(Me)_2$, $Cp_2Zr(Me)_2$, $Cp_2Hf(Me)_2$, $Cp_2Ti(OMe)_2$, $Cp_2Zr(OMe)_2$, $Cp_2Hf\ (OMe)_2$, $Cp_2Ti(OEt)_2$, $Cp_2Zr(OEt)_2$, $Cp_2Hf(OEt)_2$, $Ind_2TiCl_2$, $Ind_2ZrCl_2$, $Ind_2HfCl_2$, $Ind_2VCl_2$, $Ind_2Ti(Me)_2$, $Ind_2Zr(Me)_2$, $Ind_2Hf(Me)_2$, $Ind_2Ti(Me)_2$, $Ind_2Zr(OMe)_2$, $Ind_2Hf(OMe)_2$, $Ind_2Ti(OEt)_2$, $Ind_2Zr(OEt)_2$, $Ind_2Hf(OEt)_2$, $Flu_2TiCl_2$, $Flu_2ZrCl_2$, $Flu_2HfCl_2$, $Flu_2VCl_2$, $Flu_2Ti(Me)_2$, $Flu_2Zr(Me)_2$, $Flu_2Hf(Me)_2$, $Flu_2Ti(OMe)_2$, $Flu_2Zr(OMe)_2$, $Flu_2Hf(OMe)_2$, $Flu_2Ti(OEt)_2$, $Flu_2Zr(OEt)_2$, $Flu_2Hf(OEt)_2$, $(MeCp)_2TiCl_2$, $(MeCp)_2ZrCl_2$, $(MeCp)_2HfCl_2$, $(MeCp)_2VCl_2$, $(MeCp)_2Ti(Me)_2$, $(MeCp)_2Zr(Me)_2$, $(MeCp)_2Hf(Me)_2$, $(MeCp)_2Ti(OMe)_2$, $(MeCp)_2Zr(OMe)_2$, $(MeCp)_2Hf\ (OMe)_2$, $(MeCp)_2Ti(OEt)_2$, $(MeCp)_2Zr(OEt)_2$, $(MeCp)_2Hf(OEt)_2$, $(nBuCp)_2TiCl_2$, $(nBuCp)_2ZrCl_2$, $(nBuCp)_2HfCl_2$, $(nBuCp)_2VCl_2$, $(nBuCp)_2Ti\ (Me)_2$, $(nBuCp)_2Zr(Me)_2$, $(nBuCp)_2Hf(Me)_2$, $(nBuCp)_2Ti(OCH_3)_2$, $(nBuCp)_2Zr\ (OCH_3)_2$, $(nBuCp)_2Hf(OCH_3)_2$, $(nBuCp)_2Ti(OEt)_2$, $(nBuCp)_2Zr\ (OEt)_2$, $(nBuCp)_2Hf(OEt)_2$, $(Me_5Cp)_2TiCl_2$, $(Me_5Cp)_2ZrCl_2$, $(Me_5Cp)_2HfCl_2$, $(Me_5Cp)_2VCl_2$, $(Me_5Cp)_2Ti(Me)_2$, $(Me_5Cp)_2Zr(Me)_2$, $(Me_5Cp)_2Hf(Me)_2$, $(Me_5Cp)_2Ti(OMe)_2$, $(Me_5Cp)_2Zr(OMe)_2$, $(Me_5Cp)_2Hf(OMe)_2$, $(Me_5Cp)_2Ti(OEt)_2$, $(Me_5Cp)_2\ Zr(OEt)_2$, $(Me_5Cp)_2Hf(OEt)_2$, $(4,7\text{-}Me_2Ind)_2TiCl_2$, $(4,7\text{-}Me_2Ind)_2ZrCl_2$, $(4,7\text{-}Me_2Ind)_2HfCl_2$, $(4,7\text{-}Me_2Ind)_2VCl_2$, $(4,7\text{-}Me_2Ind)_2Ti(Me)_2$, $(4,7\text{-}Me_2Ind)_2Zr(Me)_2$, $(4,7\text{-}Me_2Ind)_2Hf(Me)_2$, $(4,7\text{-}Me_2Ind)_2Ti(OMe)_2$, $(4,7\text{-}Me_2Ind)_2\ Zr(OMe)_2$, $(4,7\text{-}Me_2Ind)_2Hf(OMe)_2$, $(4,7\text{-}Me_2Ind)_2Ti(OEt)_2$, $(4,7\text{-}Me_2Ind)_2Zr(OEt)_2$, $(4,7\text{-}Me_2Ind)_2Hf(OCH_2CH_3)_2$, $(2\text{-}MeInd)_2TiCl_2$, $(2\text{-}MeInd)_2ZrCl_2$, $(2\text{-}MeInd)_2HfCl_2$, $(2\text{-}MeInd)_2VCl_2$, $(2\text{-}MeInd)_2Ti(Me)_2$, $(2\text{-}MeInd)_2Zr(Me)_2$, $(2\text{-}MeInd)_2Hf(Me)_2$, $(2\text{-}MeInd)_2Ti(OMe)_2$, $(2\text{-}MeInd)_2Zr(OMe)_2$, $(2\text{-}MeInd)_2Hf(OMe)_2$, $(2\text{-}MeInd)_2Ti\ (OEt)_2$, $(2\text{-}MeInd)_2Zr(OEt)_2$, $(2\text{-}MeInd)_2Hf(OEt)_2$, $(2\text{-}arilInd)_2TiCl_2$, $(2\text{-}arilInd)_2\ ZrCl_2$, $(2\text{-}arilInd)_2HfCl_2$, $(2\text{-}arilInd)_2VCl_2$, $(2\text{-}arilInd)_2Ti(Me)_2$, $(2\text{-}arilInd)_2\ Zr(Me)_2$, $(2\text{-}arilInd)_2Hf(Me)_2$, $(2\text{-}arilInd)_2Ti(OMe)_2$, $(2\text{-}arilInd)_2Zr(OMe)_2$, $(2\text{-}arilInd)_2Hf(OMe)_2$, $(2\text{-}arilInd)_2Ti(OEt)_2$, $(2\text{-}arilInd)_2Zr(OEt)_2$, $(2\text{-}arilInd)_2Hf\ (OEt)_2$, $(4,5,6,7\text{-}H_4Ind)_2TiCl_2$, $(4,5,6,7\text{-}H_4Ind)_2ZrCl_2$, $(4,5,6,7\text{-}H_4Ind)_2HfCl_2$, $(4,5,6,7\text{-}H_4Ind)_2VCl_2$, $(4,5,6,7\text{-}H_4Ind)_2Ti(Me)_2$, $(4,5,6,7\text{-}H_4Ind)_2Zr(Me)_2$, $(4,5,6,7\text{-}H_4Ind)_2Hf(Me)_2$, $(4,5,6,7\text{-}H_4Ind)_2Ti(OMe)_2$, $(4,5,6,7\text{-}H_4Ind)_2Zr(OMe)_2$, $(4,5,6,7\text{-}H_4Ind)_2Hf(OMe)_2$, $(4,5,6,7\text{-}H_4Ind)_2Ti(OEt)_2$, $(4,5,6,7\text{-}H_4Ind)_2Zr(OEt)_2$, $(4,5,6,7\text{-}H_4Ind)_2Hf(OEt)_2$, $(9\text{-}MeFlu)_2TiCl_2$, $(9\text{-}MeFlu)_2ZrCl_2$, $(9\text{-}MeFlu)_2HfCl_2$, $(9\text{-}MeFlu)_2VCl_2$, $(9\text{-}MeFlu)_2Ti(Me)_2$, $(9\text{-}MeFlu)_2Zr(Me)_2$, $(9\text{-}MeFlu)_2$ Hf(Me)$_2$, (9-MeFlu)$_2$Ti(OMe)$_2$, (9-MeFlu)$_2$Zr(OMe)$_2$, (9-MeFlu)$_2$Hf(OMe)$_2$, (9-MeFlu)$_2$Ti (OEt)$_2$, (9-MeFlu)$_2$Zr (OEt)$_2$, (9-MeFlu)$_2$Hf(OEt)$_2$.

Non-limiting examples of inert organic solvents that may be used for solubilizing said metallocene are: toluene, cyclohexane, n-hexane, n-heptane, n-octane and/or mixtures thereof.

One uses an amount sufficient to suspend the material.

The amount of said metallocene that may be used in the present invention ranges from 0.1 to 10% by mass of the metal with respect to the mass of the catalytic hybrid support, preferably from 0.1 to 2%. The reaction temperature should range from 0 to 60° C., preferably from 10 to 30° C. The reaction time should range from 0.1 h to 24 h, preferably from 0.5 to 4 hours.

After reacting the metallocene with the impregnated hybrid catalytic support, the solid product obtained (supported metallocene catalyst) is washed, and the solvent contained in the product is removed.

The washing of the supported metallocene catalyst obtained is carried out with a sufficient amount of organic solvent. The wash temperature may range from room temperature to 70° C. Non-limiting examples of organic solvents include: toluene, cyclohexane, n-hexane, n-heptane and n-octane.

The removal of the supported metallocene catalyst is made with reduced pressure in a time ranging from 1 to 24 h with a vacuum pump.

The contents of metal of the group 2 or 13 of the periodic table in the supported metallocene catalysts range from 1 to 60%.

The contents of metal of the group 4 or 5 of the periodic table in the supported metallocene catalysts range from 0.1 to 10%.

The supported metallocene catalysts of the present invention are suitable for being used in processes of homopolymerizing ethylene and co-polymerizing ethylene with α-olefins in suspension or gas phase processes. The α-olefins are selected from: propene, 1-butene, 1-hexene, 4-methyl-1-pentene, 1-octene and 1-docedene.

The supported metallocene catalysts of the present invention exhibit catalytic activity ranging from 20 to 10000 kg inch/mole M·h.

During the ethylene homopolymerization process and ethylene co-polymerization process with α-olefins, one uses, in addition to the supported complex of the present invention, an alkylaluminum co-catalyst, the preferred forms being MAO, TMAL, TEAL or TIBAL.

The molar ratio of co-catalyst/catalyst (Al/M) ion the ethylene homopolymerization and co-polymerization ranges from 500 to 2000, preferably from 1000 to 1500.

The homopolymers and copolymers obtained with the supported metallocene catalysts of the present invention exhibit a broad distribution of molar mass, comprising Mw/Mn in the range from 2 to 200 and Mw in the range from 100 to 200 kg/mole.

For a better understanding of the invention and of the improvements achieved, one presents hereinafter a few comparative examples and embodiment examples, which should not be considered limitative of the scope and reach of the invention.

In the examples of the present invention, which should not be considered limitative, TEOS (Merck, >98% purity) and octadecyltrimethoxysilane (Aldrich, 90% purity), ethanol (Merck, 99.8% purity) and ammonia solution (Dinâmica, 25% ammonia), TEAL (Akzo, 10% Al), MAO (Akzo, 10% Al) and the biscyclopentadienyl zirconium IV chloride (Boulder) are used without previous purification.

Toluene (Nuclear, 98% purity) and 1-hexene (Merck), used in preparing the supported metallocene catalyst and in co-polymerizing ethylene with alpha-olefins, is dried according to the conventional techniques. All the manipulations were carried out by using inert nitrogen atmosphere with maximum limit of 1.5 ppm of humidity.

Example 1 describes the preparation of a non-hybrid silica support (comparative). Examples 2 to 6 describe the preparation of the hybrid catalytic supports with different contents of aliphatic organic groups with 18 carbon atoms. Examples 7 to 12 illustrate the synthesis of supported metallocene catalysts prepared with the supports of examples 2 to 6.

EXAMPLE 1: Preparation of a (Comparative) Conventional Catalytic Support

This example illustrates the use of TEOS as an agent for preparing a non-hybrid catalytic support based on silica.

In a solution containing 200 mL ethanol and 40 mL ammonia solution, under stirring of 150 rpm, one adds 10 mL of a solution containing 2 mL TEOS in ethanol. The suspension is left under stirring at the temperature of 25° C. for 2 h, and the resulting solid is dried, washed with ethanol and dried again in vacuum.

This component obtained was characterized, exhibiting the following characteristics:

C content:

2.5% (w/w)—FIG. 1.

The use of TEOS without octadecyltrimethoxysilane in preparing the support results in a silica with 2.5% carbon. In this case, since the support does not have aliphatic organic groups, the organic content is attributed to the presence of residual ethoxyde groups. According to FIG. 1, this support exhibits a spherical morphology.

EXAMPLE 2: Preparation of Hybrid Catalytic Support

This example illustrates the use of TEOS and octadecyltrimethoxysilane at the molar ratio of 50:1, as reactants for preparing the hybrid catalytic support having aliphatic organic groups.

In a solution containing 200 mL ethanol and 400 mL ammonia solution, under stirring of 150 rpm, one adds 10 mL of a solution containing 2 mL TEOS in ethanol. The suspension is kept under stirring at the temperature of 25° C. for 2 h. After this period, one adds, drop by drop, 5 mL of a solution containing 0.085 mL of octadecyltrimethoxysilane in ethanol. The suspension is kept under stirring at the temperature of 25° C. for a further 2 hours, and the resulting solid is dried in vacuum, washed with ethanol and dried again in vacuum.

This component obtained was characterized, exhibiting the following characteristics:

C content: 5.1% w/w).

The carbon content obtained for this support (5.1%) is higher than that observed in the support of the comparative example (Example 1), which demonstrates the incorporation of the hydrocarbon groups of the octadecyl type (with 18 carbon atoms) in the support and, therefore, proves the formation of the hybrid support.

EXAMPLE 3: Preparation of the Hybrid Catalytic Support

This example illustrates the use of TEOS and octadecyltrimethoxysilane at the molar ratio of: 20:1, as reactants for preparing the hybrid catalytic support provided with aliphatic organic groups.

In a solution containing 200 mL ethanol and 400 mL of ammonia solution, under stirring of 150 rpm, one adds 10 mL of a solution containing 2 mL of TEOS in ethanol. The suspension is kept under stirring at the temperature of 25° C. for 2 h. After this period, one adds, drop by drop, 5 mL of a solution containing 0.21 mL of octadecyltrimethoxysilane in ethanol. The suspension is kept under stirring at the temperature of 25° C. for a further 2 h, and the resulting solid is dried in vacuum, washed with ethanol and dried again in vacuum.

Figure 2:
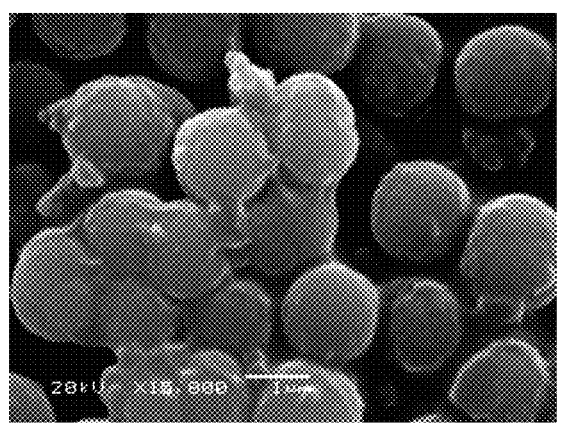
FIG. 2—image of scanning electron microscopy of the hybrid support obtained in Example 3.

This component obtained was characterized, exhibiting the following characteristics:

C content: 10.8% (w/w)—FIG. 2.

The carbon content obtained for this support (10.8%) is higher than that observed in the support of Example 2, which demonstrates a larger number of hydrocarbon groups of the octadecyl type (with 18 carbon atoms) in this support. According to FIG. 2, this support exhibits a spherical morphology with lamellar covering.

EXAMPLE 4: Preparation of the Hybrid Catalytic Support

In a solution containing 200 mL ethanol and 400 mL of ammonia solution, under stirring of 150 rpm, one adds 10 mL of a solution containing 2 mL of TEOS in ethanol. The suspension is kept under stirring at the temperature of 25° C. for 2 h. After this period, one adds, drop by drop, 5 mL of a solution containing 0.42 mL of octadecyltrimethoxysilane in ethanol. The suspension is kept under stirring at the temperature of 25° C. for a further 2 h, and the resulting solid is dried in vacuum, washed with ethanol and dried again in vacuum.

Figure 3:
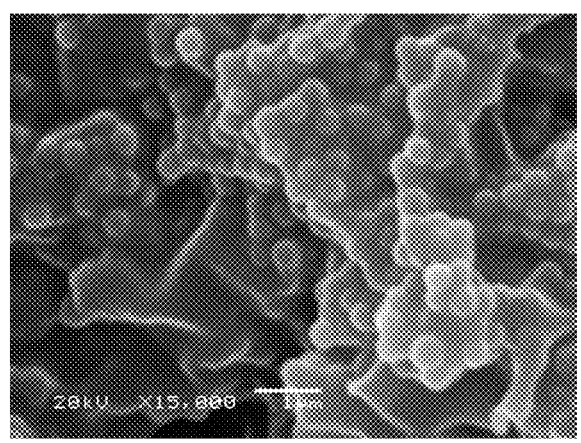
FIG. 3—image of scanning electron microscopy of the hybrid support obtained in Example 4.

This component obtained was characterized, exhibiting the following characteristics:

C content: 19.8% (w/w)—FIG. 3.

The carbon content obtained for this support (19.8%) is higher than that observed in the support of Example 3, which demonstrates a larger number of hydrocarbon groups of the octadecyl type (with 18 carbon atoms) in the support. According to FIG. 3, this support exhibits a spherical morphology with lamellar domains.

EXAMPLE 5: Preparation of the Hybrid Catalytic Support

This example illustrates the use of TEOS and octadecyltrimethoxysilane at the molar ratio of 5:1, as agents for preparing the hybrid catalytic support provided with aliphatic organic groups.

In a solution containing 200 mL ethanol and 400 mL of ammonia solution, under stirring of 150 rpm, one adds 10 mL of a solution containing 2 mL of TEOS in ethanol. The suspension is kept under stirring at the temperature of 25° C. for 2 h. After this period, one adds, drop by drop, 5 mL of a solution containing 0.84 mL of octadecyltrimethoxysilane in ethanol. The suspension is kept under stirring at the temperature of 25° C. for a further 2 h, and the resulting solid is dried in vacuum, washed with ethanol and dried again in vacuum.

Figure 4:
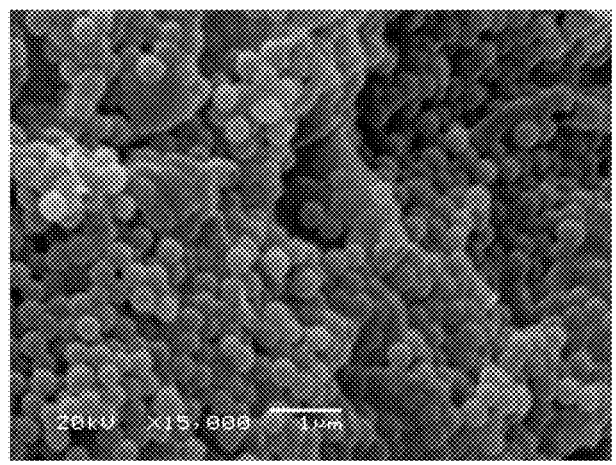
FIG. 4—image of scanning electron microscopy of the hybrid support obtained in Example 5.

This component obtained was characterized, exhibiting the following characteristics:

C content: 37.3% (w/w)—FIG. 4.

The carbon content obtained for this support (37.3%) is higher than that observed in the support of Example 4, which demonstrates a larger number of hydrocarbon groups of the octadecyl type (with 18 carbon atoms) in this support. According to FIG. 4, this support exhibits a spherical and lamellar morphology.

EXAMPLE 6: Preparation of the Hybrid Catalytic Support

This example illustrates the use of octadecyltrimethoxysilane without TEOS as a reactant for preparing the hybrid catalytic support provided with aliphatic organic groups.

In a solution containing 200 mL ethanol and 40 mL of ammonia solution, under stirring of 150 rpm, one adds 10 mL of a solution containing 2 mL of octadecyltrimethoxysilane in ethanol. The suspension is kept under stirring at the temperature of 25° C. for 2 hours, and the resulting solid is dried, washed with ethanol and dried again in vacuum.

Figure 5:
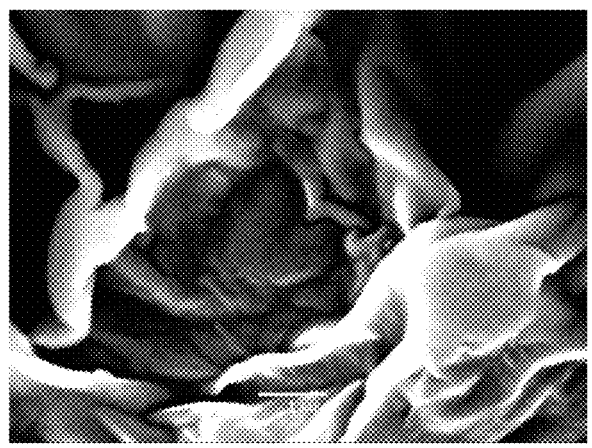
FIG. 5—image of scanning electron microscopy of the hybrid support obtained in Example 6.

This component obtained was characterized, exhibiting the following characteristics:

C content: 68.6% (w/w)—FIG. 5.

The carbon content obtained for this support (68.6%) is higher than that observed in the support of Example 5, which demonstrates a larger number of hydrocarbon groups of the octadecyl type (with 18 carbon atoms) in support. According to FIG. 5, this support exhibits a lamellar morphology.

Considering the results of Examples 2 to 6, the increase in the number of hydrocarbon groups of the octadecyl type in the support entails an increase in the domains with lamellar morphology and, consequently, reduction of the sphericity of the support particles.

EXAMPLES 7-12: Preparation of the Supported Metallocene Catalyst

In 50 mL of toluene, under stirring of 150 rpm, one suspends 1 g of the hybrid catalytic support obtained according to the examples described above. To the suspension one adds 2 mL of TEAL solution at a temperature of 25° C. This suspension is kept at this temperature and under stirring for 1 hour. After this period, in the same experimental conditions, one adds to the suspension 10 mL of a solution containing 32 mg of biscyclopentadienyl zirconium IV chloride in toluene. The reaction is carried out in a 2-hour period. After this period, the resulting solid is dried, washed with toluene and dried again in vacuum.

The results of contents of Al and Zr for the supported metallocene catalysts obtained with the hybrid catalytic support of Examples 1-6 are presented in Table 1.

TABLE 1

Results of the contents of Al and Zr for the supported metallocene catalysts obtained from the hybrid catalytic supports as described in Examples 1 to 6.

| Hybrid catalytic support | Supported Metallocene catalyst | Content of Al (% w/w) | Content of Zr (% w/w) |
|---|---|---|---|
| Example 1 | Example 7 | 1.0 | 0.5 |
| Example 2 | Example 8 | 8.6 | 0.5 |
| Example 3 | Example 9 | 7.2 | 0.5 |
| Example 4 | Example 10 | n.d. | 0.2 |

TABLE 1-continued

Results of the contents of Al and Zr for the supported metallocene catalysts obtained from the hybrid catalytic supports as described in Examples 1 to 6.

| Hybrid catalytic support | Supported Metallocene catalyst | Content of Al (% w/w) | Content of Zr (% w/w) |
|---|---|---|---|
| Example 5 | Example 11 | 1.1 | 0.1 |
| Example 6 | Example 12 | n.d. | 0.3 | n.d.: Not determined.

According to Table 1, the Al content in the supported metallocene catalysts prepared with the supports of Examples 1 to 6 ranges from 1 to 9%. These results demonstrate the presence of TEAL in the composition of the supported metallocene catalysts. The Zr contents in the supported metallocene catalysts range from 0.1 to 0.5%. One observes that, for the catalysts synthesized with the supports prepared by using TEOS (Examples 7-11), the systems with higher contents of octadecyl groups exhibit content of Zr and, therefore, of immobilized metallocene complex (Examples 10 and 11). For systems with lower contents of octadecyl groups (Examples 8 and 9), there is no reduction of the contents of the immobilized metallocene complex as compared with the metallocene catalytic system prepared by using the non-hybrid support (Example 7).

EXAMPLE 13: Polymerizations

In a glass reactor with 300 mL capacity and under magnetic stirring, one adds toluene in nitrogen atmosphere. The temperature is adjusted to 60° C. with the aid of a thermostatized bath. An amount of 10 mL of TEAL is added for washing the reactor. The washing time is of at least thirty minutes. The wash liquid is removed from the reactor by siphoning. After washing the reactor, one adds toluene and MAO and then the reactor is purged with ethylene. Once the purging has been carried out, the metallocene catalyst supported in a hybrid support, dissolved in toluene, is added to the reactor, forming a catalytic system with concentration of Zr of $10^{-6}$ Mole/L and with Al/Zr ratio preferably of 1500. The ethylene pressure is adjusted to 1.6 atm, and polymerization is carried out for 30 min. the resulting polymer is precipitated in acidified ethanol solution, filtered, washed with water and ethanol and dried in an oven in vacuum. For copolymerization, 15 mL of 1-hezen are added just before adding the supported metallocene catalyst.

The results of catalytic activity in the polymerization of the ethylene of the supported metallocene catalysts obtained with the hybrid catalytic supports of spherical and/or lamellar morphology are presented in Table 2.

TABLE 2

Catalytic activity obtained in the polymerization of the ethylene by using supported metallocene catalysts.

| Supported metallocene catalyst | Catalytic activity (kg pol/mole Zr · h) |
|---|---|
| Example 7 | 30 |
| Example 8 | 690 |
| Example 8* | 870 |
| Example 9 | 860 |
| Example 10 | 310 |
| Example 11 | 450 |
| Example 12 | 200 |

*In this case, a co-polymerization of ethylene with 1-hexene was carried out.

According to Table 2, the supported metallocene catalysts prepared with the hybrid supports provided with octadecyl groups (Example 8-12) exhibit catalytic activities superior to that observed for the supported metallocene catalyst prepared by using a non-hybrid support of Example 7 (comparative).

The results of the properties of the polymers formed are presented in Table 3 below.

TABLE 3

Properties of the polymers obtained with supported metallocene catalyst.

| Supported metallocene catalyst | Tm (° C.) | Mw (kg/mole) | Mw/Mn |
|---|---|---|---|
| Example 7 | 132 | 240 | 2.2 |
| Example 8 | 133 | 450 | 3.6 |
| Example 8* | 112 | 170 | 5.4 |
| Example 9 | 133 | 250 | 6.1 |
| Example 10 | 133 | 360 | 2.6 |
| Example 11 | 133 | 580 | 3.5 |
| Example 12 | 133 | 680 | 2.9 |

*In this case, a co-polymerization of ethylene with 1-hexen was carried out.

Figure 6:
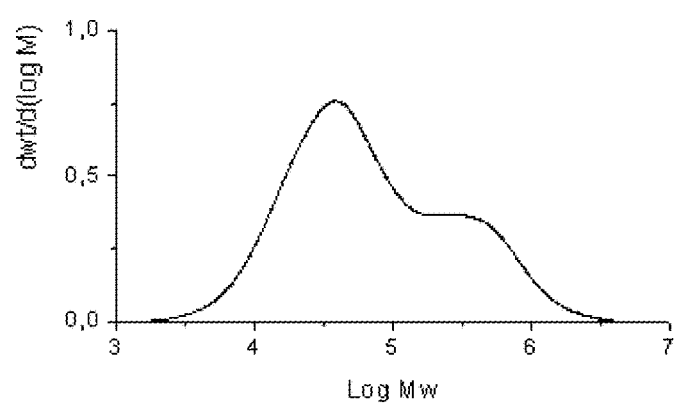
FIG. 6—GPC curve for the polyethylene prepared with the catalyst obtained in Example 8.
Figure 7:
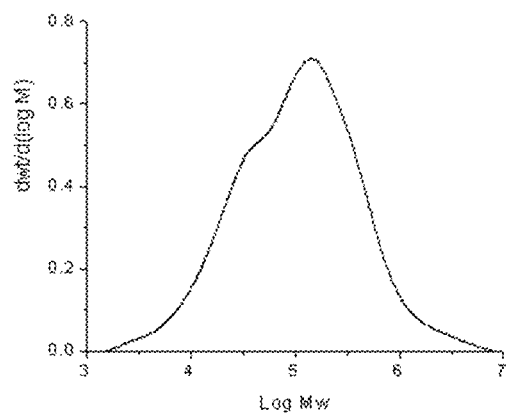
FIG. 7—GPC curve for the polyethylene prepared with the catalyst obtained in Example 9.
Figure 8:
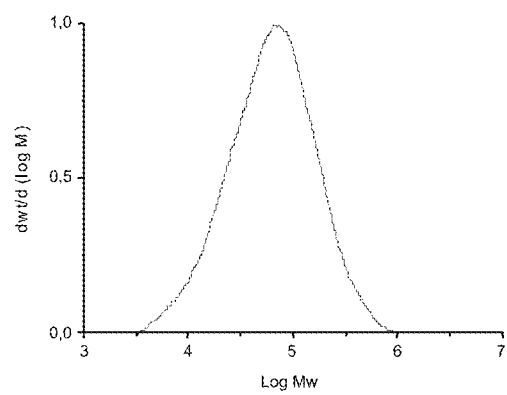
FIG. 8—GPC curve for the polyethylene prepared with the catalyst obtained in Example 7 (comparative).

According to Table 3, the ethylene polymers produced by using the supported metallocene catalysts prepared with the hybrid supports having octadecyl groups (Examples 8-12) exhibit molar masses (Mw) higher than that observed for the ethylene polymer produced with the metallocene catalyst of Example 7 (comparative). With regard to the distribution of molar mass (Mw/Mn) of the polyethylenes, the polymers produced by using the supported metallocene catalysts prepared with the hybrid catalytic supports having octadecyl groups (Examples 8-12) have broadened values with respect to that observed for the polymer produced with the metallocene catalyst of Example 7 (comparative), which suggests better processability of the polymers prepared with the catalysts of the present invention. In addition to the broadening of the polydispersion, the polymers obtained with the supported metallocene catalysts of the present invention exhibit a bimodal molar mass distribution, as can be observed in FIGS. 6 and 7, unlike the polymer prepared with the catalyst of the comparative example (Example 7), wherein the molar mass distribution is unimodal (FIG. 8).

These results demonstrate that the broadening of the molar mass distribution of the polyethylenes is achieved by using a single type of immobilized metallocene complex in the supports and is the effect of the modification of inorganic component by the aliphatic organic groups.

Therefore, the considerations and examples of the present specification demonstrate the distinctive points of the present invention with respect to the prior art, which make the inventive process non-suggested and non-evident in the face of the literature published on the subject.

A preferred example of embodiment having been described, it should be understood that the scope of the present invention embraces other possible variations, being limited only by the contents of the accompanying claims which include the possible equivalents.

What is claimed is:

1. A metallocene catalyst supported in a hybrid support, comprising:
   (I) at least one metallocene derived from a compound of formula 1:

[L]$_2$-MQ$_2$  formula (1)

wherein:
   M is a transition metal of group 4 or 5 of the periodic table;
   Q comprises: halogen radical, aryl radical, alkyl radical containing 1 to 5 carbon atoms or alkoxy radical containing from 1 to 5 carbon atoms; and
   L is a ligand selected from: cyclopentadienyl, indenyl or fluorenyl, optionally substituted with hydrogen, alkyl, cycloalkyl, aryl, alkenyl, alkylaryl, arylalkyl or arylalkenyl, attached to the transition metal by bonding;
   (II) a hybrid catalytic support having at least one inorganic silica component and aliphatic organic groups chemically bonded to the inorganic silica component, wherein the aliphatic organic groups are on both the surface and inside the inorganic silica component; and
   (III) at least one organometallic compound containing a metal selected from group 2 or 13 of the periodic table,
   and wherein the aliphatic organic groups comprise a chain containing from 8 to 22 carbon atoms and are homogeneously dispersed throughout the inorganic silica component.

2. The supported metallocene catalyst as recited in claim 1, wherein the contents of aliphatic organic groups measured through carbon content range from 0.5 to 80% by mass.

3. The supported metallocene catalyst as recited in claim 1, wherein the hybrid catalytic support is obtained by means of hydrolytic sol-gel.

4. The supported metallocene catalyst as recited in claim 1, wherein the metal contents of the group 4 or 5 range from 0.1 to 10% by mass of metal with respect to the mass of the catalytic hybrid support.

5. The supported metallocene catalyst as recited in claim 1, wherein the metal contents of the group 2 or 13 of the periodic table ranges from 1% to 60% by mass with respect to the total mass of the supported catalyst.

6. The supported metallocene catalyst as recited in claim 1, wherein the organometallic compound is selected from: trimethylaluminum (TMAL), triethylaluminum (TEAL), tri-isobutylaluminum (TIBAL), tri-n-hexylaluminum (TNHAL), tri-n-octylaluminum (TNOAL), dimethylaluminum (DOMAC), methylaluminum dichloride (MADC), diethylaluminum chloride (DEAC), ethylaluminum dichloride (EADC), di-isobutylaluminum chloride (DIBAC), isobutylaluminum dichloride (MONIBAC), ethylmagnesium butyl (BEM), butyl octylmagnesium (BOMAG), methylmagnesium chloride, ethylmagnesium chloride or mixtures thereof.

* * * * *

UNITED STATES PATENT AND TRADEMARK OFFICE
CERTIFICATE OF CORRECTION

PATENT NO.         : 9,695,254 B2  
APPLICATION NO.    : 14/646854  
DATED              : July 4, 2017  
INVENTOR(S)        : Brambilla et al.

Page 1 of 1

It is certified that error appears in the above-identified patent and that said Letters Patent is hereby corrected as shown below:

On the Title Page

Item (73) Assignee: "Braskem S.A., Camacari-BA (BR)" is corrected to read:  
--Braskem S.A., Camacari-BA (BR);  
Universidade Federal do Rio Grande do Sul, Porto Alegre (BR)--

Signed and Sealed this  
Twenty-sixth Day of September, 2017

Joseph Matal  
*Performing the Functions and Duties of the*  
*Under Secretary of Commerce for Intellectual Property and*  
*Director of the United States Patent and Trademark Office*